3,531,369
GLASS REINFORCED THERMOPLASTIC SHEET
John A. Baumann, Lebanon, and Glen E. Ingraham, Somerville, N.J., assignors to Union Carbide Corporation, a corporation of New York
No Drawing. Filed June 16, 1966, Ser. No. 557,906
Int. Cl. B32b 17/04; C03c 27/12
U.S. Cl. 161—187                                                     17 Claims

ABSTRACT OF THE DISCLOSURE

This invention relates to glass fibers bonded by a thermally degraded resin which is either a styrene-acrylonitrile polymer, a polyvinyl chloride resin, a polyhydroxy ether resin or a polyarylene ether resin wherein the resin is thermally degraded, by heat, to an extent sufficient to improve the physical properties thereof. The glass fiber reinforced thermoplastics are used in laminating applications and also in molding applications.

---

The present invention relates to an improved glass reinforced thermoplastic laminate. More particularly this invention relates to glass-fiber webs, bonded with, impregnated with, and or laminated with certain specific polymers, which demonstrate improved strength properties after thermal degradations, and to methods for preparing same.

While the use of glass fiber reinforcements has been long known and used in the preparation of sheet materials utilizing thermosetting matrix resins, the use of these materials in thermoplastic resins is comparatively recent. Thermoplastic resins are generally used with glass fibers to serve three separate and distinct functions by three distinct applications. Briefly these are:

BONDING OR BINDER RESINS

When the glass fibers are spun from molten glass and then laid into a mat or woven into a cloth or other type fabric, it is necessary to bond the fibers together in order to maintain the integrity of the mat or cloth. This is particularly important when the mat is composed of one or more continuous strands laid up to form a swirl mat. The bonding resin is generally used in a very small amount relative to the weight of the glass treated, and is conveniently applied by dipping or spraying the mat or fabric with a relatively dilute solution or dispersion of resin. Since a very small amount of resin is used, the particular type of resin is not of great consequence. However, in the conduct of this invention it has been found desirable, although not necessary, to use the same resin to be used in the preparation of the laminate or a resin exhibiting good compatibility with such resin.

PREPREG RESIN

After the glass-fiber reinforcement web, in the form of either mat or fabric, has been bonded, it is desirable to form it into sheet material having a higher resin content, before using it in laminate structures. These relatively rigid sheets are known as "prepregs" and are formed by impregnating the webs with resin solution in a manner similar to that used with the bonding resin. The prepreg resins however, are used in much greater amounts and in a much higher resin to glass weight ratio. This is easily accomplished by using a resin solution having a much higher concentration of resin. The glass-fiber prepregs are used directly in the preparation of laminates. The resins used in the prepreg coating are desirably the same as to be used in the laminate or matrix resin as optimum lamination and adhesion is achieved.

MATRIX RESIN

The matrix or laminate resin generally provides the greatest amount of resin to the prepared laminate. This resin is advantageously used in sheet or film form. In the preparation of the laminates one or more glass-fiber prepregs are interleaved with two or more sheets of matrix resin. The stacked plies are then subjected to heat and pressure to form an integral, laminate sheet.

As will be more clearly defined hereinafter, the present invention is applicable to thermoplastic resin/glass combinations in respect to all three forms i.e. bonding resins, prepreg resins and matrix resins separately or in combination.

While the use of thermoplastic resins in reinforced sheet materials has been found to provide a large number of advantages in cost, efficiency and ease of manufacture and fabrication, the use of these resins has also created several disadvantages. For example, certain advances have been made with thermoset resins by improving the strength of the laminate through the use of coupling agents on the glass-fiber. None of these coupling agents however, has been found to be completely satisfactory with a number of the otherwise desirable thermoplastic resins. Included within this category of thermoplastic resins are polyvinyl chloride, styrene-acrylonitrile copolymers, polyhydroxy ethers, polyarylene polyethers and the like. As a result of the relatively poor adhesion of these resins to glass-fiber, laminates made from them, exhibit relatively poor flexural moduli and strengths. This naturally limits the utility of these resins.

It has now been found however, that excellent adhesion of these resins to glass fiber can be easily provided by merely thermally degrading the polymer while in intimate contact with the glass-fiber. This invention is applicable to all three combinations of glass resin as indicated above. However, as will be seen from the examples, the greatest amount of strength is obtained from degradation of the matrix resins. A noticeable increase occurs with the prepreg resins and a lesser amount with the bonding resins.

As a general rule, when thermoplastic resins are thermally degraded or pyrolyzed, they exhibit poorer physical properties and poorer adhesion to the reinforcement material. It is therefore believed to be both unexpected and surprising to find that certain specific polymers when reinforced with or in contact with glass exhibit enhanced bonding and enhanced flexural strength, after thermal degradation.

Those thermoplastic polymers which have been found to provide enhanced physical properties to glass reinforced laminates after thermal degradation in accordance with this invention are as follows: vinyl chloride polymers; styrene-acrylonitrile copolymers; polyarylene polyethers; polyhydroxy ethers.

The vinyl chloride polymers are those which contain a predominant amount of polymerized vinyl chloride monomer. Preferably, these resins contain at least 80 percent polymerized vinyl chloride monomer in their composition. The most preferred resin of the vinyl chloride polymers is polyvinyl chloride. This preference is dictated by the outstanding increase in physical properties which this resin provides to glass reinforced structures after thermal degradation and also by the inexpensiveness and ready availability of this resin. Polyvinyl chloride used as a matrix resin for glass reinforced laminates is genearlly considered to provide insufficient strength, modulus and adhesion to be acceptable for most uses.

The styrene-acrylonitrile copolymers are those prepared from styrene and acrylonitrile. These preferably contain from about 24 to about 28 weight percent polymerized acrylonitrile, although copolymers containing a greater or lesser amount can be used, for example from about 20 to about 30 weight percent combined acrylonitrile. While the styrene-acrylonitrile copolymers normally provide relatively good adhesive bonding to glass fibers and relatively good physical properties, thermal degradation as proposed by this invention provides enhanced physical properties especially in respect to flexural modulus or stiffness. Since stiffness is of acute importance in certain applications, laminates using the thermal degradation procedures of this invention can provide substantial property advantages.

The polyhydroxy ether resins are the linear thermoplastic resins formed by the reaction of compounds such as bis-phenol A and epichlorohydrin. A complete description of these resins and their properties can be found in copending application Ser. No. 245,647 filed on Dec. 19, 1962, now U.S. Pat. No. 3,238,087.

Thermoplastic polyarylene polyethers useful in the present invention are linear thermoplastic polymers having a basic structure composed of recurring units having the formula

$$—O—E—O—E'—\qquad (I)$$

wherein E is the residuum of the dihydric phenol and E' is the residuum of the benzenoid compound having an inert electron withdrawing group in at least one of the positions ortho and para to the valence bonds, and where both of said residua are valently bonded to the ether oxygens through aromatic carbon atoms. The residua E and E' are characterized in this manner since they are conveniently prepared by the reaction of an alkali metal double salt of a dihydric phenol and a dihalobenzenoid compound having an electron withdrawing group as is described in Belgian Pat. 650,476 issued in Jan. 29, 1965.

By the term glass fibers is meant those finely divided glass filaments which are commonly used in the industry as reinforcements. Included within this definition are all of the available forms of such fibers such as filaments, threads, yarns, rovings, scrim, cloth, woven roving, swirl mat and the like.

While these fibers are initially uncoated glass, it is customary practice in the industry to apply one or more coating materials to the glass to serve specific functions. For example, coatings containing minor amounts of organosilanes as coupling agents increase the adhesion between the resin matrix and the glass. Similarly various bonding resins can be applied in minor amounts to bind the fibers together and maintain the fibers in a form which can be easily handled. Both the coated and uncoated glass can be used in the practice of this invention. However, it is desirable to provide the glass with a bonding resin to permit easy handling of the glass in the preparation of laminates. When such bonding resins are used, they should preferably be selected in respect to the matrix resin and/or prepreg resin eventually to be used and desirably should be the same. As is indicated hereinafter, the bonding resin itself can be thermally degraded on the glass to provide improved physical properties to the laminate as well as decorative effects.

The bonding resins are generally applied to the glass as dilute solutions, latexes, emulsions, dispersions and the like, and can be applied by spraying, dipping, coating and other such means as are well known to the art. The bonding resins are usually applied in a resin to glass weight ratio of from about 5:95 to about 15:85 although greater or lesser ratios can be effectively used. The concentration of the bonding resin in solution is usually from about 7 to about 20%.

The glass-fiber prepregs are generally prepared by coating the glass mat with a more concentrated resin solution. Desirably, a resin coating is used which provides a resin to glass weight ratio of from about 10% to about 50%. Coating solutions having concentrations of from about 10% to about 40% are generally employed although, again, greater or lesser amounts can be provided, if desired.

When solutions of the resins are to be used to either bond the glass fiber or form a prepreg any convenient inert solvents can be used which are capable of dissolving the particular resin to be used. Illustrative of such solvents are methyl ethyl ketone, methyl isobutyl ketone, acetone, toluene, xylene, cyclohexane, dimethyl formamide, tetrahydrofuran, ethylene dichloride, methylene chloride and the like.

After the glass mat or prepreg has been coated with resin coating solution, it is dried. While the drying step can generally be combined with the thermal degradation step, rapid drying can cause bubbles to form which can be undesirable in certain applications. It is therefore usually desirable to dry the solution coated mat for a sufficient period of time to remove the solvent. This is conveniently accomplished by heating the mat to a temperature of from 300 to 325° F. for a period of from about 1 to about 3 minutes.

After the bonded glass fiber mat or prepreg has been dried, it can be heated to a temperature sufficient to thermally degrade the resin. The duration of degradation heating is greater for the prepreg than for the bonded mat because of the difference in thickness and weight. The temperature used in the degradation step depends on the particular polymer used and the cycle desired. The degradation should not be so drastic as to severely reduce the molecular weight of the polymer or produce large amounts of objectionable degradation product. The point of optimum degradation can easily be determined by simple experiment for the particular system to be used. However, in respect to the bonded glass mat or prepregs, the appearance of color in unpigmented resin can be considered a sign of sufficient degradation, although the degradation can be continued beyond this point without difficulty provided the resin does not become objectionally degraded. Polyvinyl chloride resin can in fact, be degraded to a jet black color provided severe generation of hydrochloric acid is avoided. When resins such as polyvinyl chloride are utilized as the bonding or prepreg and matrix resins, the bonding and/or prepreg resin will discolor or darken upon degradation. If the matrix resin of the laminate used is clear or translucent the darker web pattern of the mat or prepreg provides an attractive decorative effect. Such laminates are useful in applications where translucent panels are desired, as in lighting fixtures and skylight panels and roofs.

When the thermally degraded prepreg is used in the preparation of the laminate panel or sheet conventional techniques can be employed. The prepregs can be interleaved with resin sheets and conventional laminating pressures and temperatures can be employed. The thermally degraded prepregs will provide outstanding flexural properties to the sheet. However, if desired the pre-degraded prepregs or undegraded prepregs can be stacked and degraded under heat and pressure in the laminating press. By this procedure the pressure used is generally from about 100 p.s.i. to about 400 p.s.i. The temperature used is that which is sufficient to degrade the resin in the laminate, without producing excessive amounts of undesired by-products and without seriously increasing the melt index. As indicated above the onset of color to the resin is an indication of sufficient pyrolysis. By this latter method however the time of degradation will be dependent on the number of plies, the resin, the operating temperature, the pressure and the thickness of the plies.

When the matrix resin is polyvinyl chloride, the degradation process can be continued until the matrix resin surface is a glossy jet black. This glass reinforced thermoplastic resin laminate is not only exceptionally strong and stiff relative to similar undegraded laminate but is also unusually attractive.

The resin degraded prepreg however offers certain advantages in that it can be oven degraded in a separate operation and thereby avoids the difficulties inherent in high temperature presses. When the web effect of the prepreg is not desired the laminate can contain one or more lamina which are opaque. Pigmented and/or dyed resins can be effectively used in the process of this invention provided the pigments or dyes are stable under the degradation conditions.

While the thermal degradation temperatures vary for each of the particular bonding or matrix resins employed, these temperatures are easily ascertained. The degradation periods will vary not only in respect to the particular resin used but also in respect to the particular use for which the resin has been applied i.e., as bonding resin a prepreg resin or as a matrix resin in a laminate, the former requiring a shorter heating period than the latter. The degradation temperatures and times for several illustrative resins are given below.

| Resin | Degradation temperature[1] | Degradation period, min. Prepreg | Laminate |
|---|---|---|---|
| Polyvinyl chloride: | | | |
| Acceptable | 325° to 375° F | 4 | 1-5 |
| Preferred | 340° to 350° F | 4 | 2 |
| Styrene-acrylonitrile copolymer: | | | |
| Acceptable | 350° to 500° F | 1-10 | 1-15 |
| Preferred | 450° to 500° F | 2-6 | *1 |
| Polyhydroxy ether: | | | |
| Acceptable | 450° to 550° F | | 1-10 |
| Preferred | 470° to 580° F | | 1-5 |
| Polysulfone resin a polyarylene ether: | | | |
| Acceptable | 550° to 700° F | | 1-10 |
| Preferred | 600° to 650° F | | 1-5 |

[1] Depends on heater available, 1 min. at temp. Longer period involved in heating up.
* Laminates are heated in the press, and then cooled directly upon reaching a set temperature, e.g. 470° F.

The degradation period at the degradation temperature will of course be dependent to a certain extent upon the thickness of the bonding resin coating on the prepreg upon the thickness and number of laminae in the laminate sheet, as well as upon the thickness or weight of the glass fiber mat.

Degradation time will also depend on whether degrading is being done in the press during lamination or prior to that by preheating resin impregnated sheet in an oven. The time requirement in this last instance depends to a large extent on the type of heat (hot air, infrared, etc.) and oven capacity as well as the temperatures to be reached.

The laminating pressures employed to bond the matrix resin sheets to the glass fiber prepreg are those which are conventionally used by the art to effect such laminations. Such pressures are generally from about 200 to about 400 pounds per square inch.

The resins useful in the conduct of this invention normally contain various additives such as stabilizers, antiblock agents, fillers, colorants and the like. It is to be understood that such additives can be present in these resins and preferably are present to the extent that they provide the characteristics for which they were incorporated. Other additives, such as acid salts, can also be used to enhance the low temperature degradation of the resin.

The glass fibers can be coated with an organosilane or such bonding resins as are normally provided in commercial manufacture, although preferably with the resins indicated herein.

As an additional embodiment, the surface characteristics of the laminates of this invention can be modified by providing surface laminae which provide the desired characteristics. These desired characteristics include gloss, hardness, absorption of radiation, color and the like. Such surface sheets can be of any suitable thickness and material which is compatible with the surface of the laminate. These sheets can be provided during the laminating step, in a second laminating step or through the use of various adhesives.

The glass fiber reinforced laminates of this invention find wide utility as indicated above. These laminates can be used in any of the areas where the thermosetting resin glass reinforced sheets can be used. The laminates of this invention however, can be easily thermoformed to provide shaped parts and the scrap can be reused as molding compounds thus improving the cost and efficiency of the fabrication. These laminates are particularly useful in providing formed parts in the automobile industry, the boat manufacuring industry and the construction industry.

The examples below serve to illustrate this invention. Flexural modulus measurements as made herein are made in accordance with A.S.T.M. D-790-59T.

In the examples below, 181 cloth is the standard commercial designation for a woven glass fiber fabric in an 8 harness satin weave with 57 x 54 ends and picks per inch. This material weighs about 8.74 ounces per square yard and is approximately 0.009 inch thick. Volan (trademark of E. I. du Pont de Nemours and Company) finish comprises treating the cloth with a methacrylate-chromic chloride in such a manner that the chrome content of the finished fabric is between 0.03 and 0.05 percent. The Volan treatment provides better wetting and bond between glass fiber and synthetic resins, especially polyesters, epoxies and phenolics.

EXAMPLE 1

A series of laminations were made utilizing commercial continuous strand mat. The matrix resin utilized was styrene-acrylonitrile copolymer containing approximately 24-28 weight percent combined acrylonitrile. The laminates were prepared by sandwiching the glass fiber mat between sheets of the matrix resin and subjecting the pile to heat and pressure in a heated press. In each case the pressures employed were contact, 300, and 600 pounds per square inch and the residence times were 5 minutes at each pressure. The temperature however, was varied as indicated below. In each case the flexural strength and flexural modulus were determined. These values are also given below:

| Laminate | Laminate temperature, ° F. | Flexural properties, p.s.i. Strength | Modulus |
|---|---|---|---|
| 1 | 356 | 32,000 | $1.2 \times 10^6$ |
| 2 | 450 | 41,000 | $1.9 \times 10^6$ |
| 3 | 500 | 57,000 | $2.3 \times 10^6$ |

From the foregoing data it is seen that the strength of the laminate pressed at 500° F. is almost 1.8 times as strong and 1.9 times as stiff as the laminate pressed at 356° F.

EXAMPLE 2

In a similar manner as described in Example 1 laminates were prepared from polyvinyl chloride matrix resin and a commercial 181 ("Volan") glass fiber cloth. The laminating pressure was the same for all laminations at 540 p.s.i. Other laminating conditions and physical properties found for these laminations are set out below:

| Lamination | Temperature (° F.) | Time (minutes) | Flexural properties, p.s.i. Strength | Modulus |
|---|---|---|---|---|
| 1 | 325 | 6 | 14,677 | $1.82 \times 10^6$ |
| 2 | 374 | 8 | 18,462 | [a] $1.84 \times 10^6$ |
| 3 | 374 | 6 | 16,540 | [b] $1.78 \times 10^6$ |
| 4 | 347 | 6 | 15,210 | $1.73 \times 10^6$ |

[a] Extensive degradation, completely black.
[b] 60 percent of area degraded black.

From this data it can be seen that laminate 2 while degraded to the point that it was completely black, provided the highest strength and stiffness values.

EXAMPLE 3

A series of lamination experiments were conducted utilizing degraded preimpregnated glass fiber mats or cloth. The resins used were as follows.

Polyvinyl chloride—Unplasticized commercial grade resin.

Styrene-acrylonitrile—Copolymer #1 containing 27–29 weight percent polymerized acrylonitrile, melt viscosity 35 mg./min. at 200° C. 100 p.s.i.[1]

Styrene-acrylonitrile—Copolymer #2 containing 27–29 weight percent polymerized acrylonitrile, melt viscosity 143 mg./min. at 200° C. 100 p.s.i.[1]

The glass fiber reinforcement used was as follows:

Commercial Swirl Mat was a continuous strand mat made from multiple layers of continuous filament in a swirl pattern. Weight of this mat was 1½ oz./sq. ft.

Procedure—Several 10" x 10" laminates were made up with two styrene-acrylonitrile copolymer resins (#1 and #2). These resins were pressed at temperatures from about 400° F. to about 600° F. Press temperatures and laminate properties are listed in Table I.

As typical of these laminations, five plies of 1½ oz. per square yard continuous strang glass fiber mat were interleaved with six layers of .017 inch thick extruded styrene-acrylonitrile copolymer resin #2 sheet. This sandwich was placed between aluminum caul plates in a cold press. The plate temperature was raised from 70° to 470° F. using a combination of steam and electric heat. The pressure on the sandwich was maintained at:

30 p.s.i. for 6 minutes
100 p.s.i. for 6 minutes
400 p.s.i. for 6 minutes
400 p.s.i. for 5 minutes during cooling.

The flexural strength and modulus was then determined and recorded. From the properties listed in Table I when compared with the properties of the predegraded prepregs, it can be seen that the advantages accrued are not due merely to melt viscosity alone as the properties of the laminates using styrene-acrylonitrile copolymer resins #1 and #2 are comparable and yet the melt viscosity of resin #2 is considerably less than that of resin #1.

In a similar manner polyvinyl chloride matrix resin was used to prepare glass reinforced laminates. A sandwich was laid up with five plies of glass fiber swirl mat and 6 plies of .005 inch polyvinyl chloride sheet. This sandwich was pressed for six minutes at 30 p.s.i., 4 minutes at 400 p.s.i. and then cooled at 400 p.s.i. for 5 minutes. The temperature was raised from ambient at start to about 375° F. when the high pressure was applied. Identical sandwiches using polyvinyl chloride sheet and fiber glass 181 cloth were pressed somewhat more slowly. A typical cycle being six minutes at 30 p.s.i., 4 minutes at 100 p.s.i., 5 minutes at 400 p.s.i. followed by 5 minutes cooling at 400 p.s.i. The prepreged glass fiber samples were dipped in a 10 percent solution of polyvinyl chloride resin in methyl ethyl ketone and were dried before being laid up in a sandwich as were the non-prepreged sampled.

The polyvinyl chloride-glass laminates were found to show increasing strength with increasing temperature as in the case of the styrene-acrylonitrile copolymer glass laminates, but with the polyvinyl chloride maximum flexural strengths and flexural moduli were obtained on pressing at 375° F. Above this temperature degradation became excessive with the release of hydrochloric acid and severe discoloration of sheet. Flexural strengths and moduli of elasticity are shown in Table III below. One series of samples was made up of rigid polyvinyl chloride on swirl mat and the other on 181 glass fiber cloth. Predegrading the impregnated mat or 181 cloth before pressing produced significant improvements in strength and stiffness (moduli) of laminates.

Table II shows the comparison between predegraded and non-degraded styrene-acrylonitrile copolymer laminates when pressed at various temperatures. It was found that both the predegraded and non-degraded samples show increases in strength with higher temperatures of pressing but that the predegraded laminate was as strong when pressed at 350° F. as was the non-degraded laminate pressed at 470° F. One set of samples was made up by pressing glass fiber mat preimpregnated with 50 percent styrene acrylonitrile resin. These laminae had no resin sheet interleaved. The other set was made up of predegraded mat which was interleaved with copolymer resin sheet and pressed. The controls were made up in like manner but the mats were not degraded. Pressing cycles were similar to those of Table I, Sample 50–6.

Predegrading polyvinyl chloride resin impregnated 181 cloth effected a 50 percent increase in strength. Table IV presents data on such polyvinyl chloride resin laminates pressed at 160° C. and at 175° C. The effect is less pronounced on predegrading the polyvinyl chloride resin impregnated swirl mat laminates. In all cases, degradation of preimpregnated glass fiber plies was accomplished by heating under infrared heat. Heaters were at a temperature of 650 to 700° F. and the samples were approximately 11 inches below the heaters. Polyvinyl chloride samples were so heated for a total of 4 minutes being turned over at two minutes for uniform heating. The styrene-acrylonitrile copolymer samples were heated in a like manner for a total of six minutes, four minutes on one side, two on the other.

[1] Determined in extrusion plastometer, A.S.T.M. D–1238–57T.

TABLE I.—EFFECT OF PRESS TEMP. ON PROPERTIES OF STYRENE-ACRYLONITRILE/GLASS-FIBER SWIRL MAT LAMINATES

| | Temperature, °F. | | | | | | | |
|---|---|---|---|---|---|---|---|---|
| | 400 | 450 | 470 | 500 | 530 | 550 | 570 | 600 |
| Sample | 50–2 | 50–4 | 50–6 | 50–8 | 50–10 | 50–11 | 50–12 | 50–13 |
| Copolymer 1: | | | | | | | | |
| Flex. str., p.s.i. | 32,800 | 35,000 | 40,400 | 39,000 | 39,700 | 40,800 | 44,700 | 46,300 |
| Flex. modulus, p.s.i. | $1.6 \times 10^6$ | $1.74 \times 10^6$ | $1.93 \times 10^6$ | $1.92 \times 10^6$ | $2.04 \times 10^6$ | $1.91 \times 10^6$ | $2.08 \times 10^6$ | $2.17 \times 10^6$ |
| Thickness, in. | .104 | .104 | .100 | .100 | .101 | .106 | .106 | .099 |
| Percent glass | 54.1 | 54.0 | 54.1 | 54.9 | 55.4 | 52.7 | 54.9 | 54.4 |
| Sample | 50–1 | 50–3 | 50–5 | 50–7 | 50–9 | | | |
| Copolymer 2: | | | | | | | | |
| Flex. str., p.s.i. | 35,700 | 34,500 | 39,000 | 38,600 | 40,700 | | | |
| Flex. modulus, p.s.i. | $1.86 \times 10^6$ | $1.66 \times 10^6$ | $2.00 \times 10^6$ | $1.94 \times 10^6$ | $1.87 \times 10^6$ | | | |
| Thickness | .111 | .108 | .104 | .102 | .082 | | | |
| Percent glass | 51.0 | 50.4 | 55.8 | 54.2 | 54.7 | | | |

TABLE II.—EFFECT OF PRE-DEGRADING STYRENE-ACRYLONITRILE GLASS FIBER PREPREGS ON PHYSICAL PROPERTIES

| Sample No. | Flexural Strength, p.s.i. | Flex. Modulus, p.s.i. | Laminate Thickness, inch | Glass Content, wt. percent | Press Temp., °F. | Predegrade | Flex. Increase, percent |
|---|---|---|---|---|---|---|---|
| 50% prepreg: | | | | | | | |
| 45-1 | 45,600 | 2.53×10⁶ | .075 | 60 | 470 | Yes | 17 |
| 45-2 | 38,700 | 1.88×10⁶ | .090 | 51.4 | 470 | No | |
| 45-3 | 41,900 | 2.47×10⁶ | .076 | 57.4 | 435 | Yes | |
| 45-4 | 37,900 | 2.09×10⁶ | .092 | 54.7 | 435 | No | 10 |
| 45-5 | 44,400 | 2.42×10⁶ | .085 | 53.4 | 400 | Yes | |
| 45-6 | 38,300 | 2.04×10⁶ | .091 | 50.7 | 400 | No | 16 |
| 45-7 | 36,200 | 2.10×10⁶ | .093 | 55.2 | 350 | Yes | |
| 45-8 | 33,200 | 1.72×10⁶ | .090 | 51.1 | 350 | No | 8 |
| 10% prepreg: | | | | | | | |
| 52-1 | 42,700 | 1.88×10⁶ | .111 | 47.5 | 470 | Yes | |
| 52-2 | 37,800 | 1.61×10⁶ | .113 | 47.3 | 470 | No | 12 |
| 52-3 | 41,000 | 1.80×10⁶ | .116 | 48.9 | 435 | Yes | |
| 52-4 | 36,200 | 1.67×10⁶ | .112 | 48.0 | 435 | No | 13 |
| 52-5 | 40,200 | 1.82×10⁶ | .116 | 47.0 | 400 | Yes | |
| 52-6 | 34,300 | 1.63×10⁶ | .116 | 48.7 | 400 | No | 16 |
| 52-7 | 37,700 | 1.74×10⁶ | .119 | 44.5 | 350 | Yes | |
| 52-8 | 30,900 | 1.42×10⁶ | .115 | 45.5 | 350 | No | 22 |

TABLE III.—EFFECT OF PRESS TEMPERATURE ON PROPERTIES OF POLYVINYL CHLORIDE GLASS-FIBER LAMINATES

| | Press Temperature, °F. | | | | |
|---|---|---|---|---|---|
| | 320 | 347 | 375 | 400 | 428 |
| Sample No. | 40-2 | 40-4 | 46-1 | 46-2 | 46-3 |
| Polyvinyl Chloride/Swirl Mat: | | | | | |
| Flex. strength, p.s.i. | 24,300 | 26,800 | 34,700 | 26,800 | 22,400 |
| Flex. Modulus, p.s.i. | 1.57×10⁶ | 1.56×10⁶ | 1.80×10⁶ | 1.67×10⁶ | 1.60×10⁶ |
| Thickness, in. | .105 | .106 | .103 | .103 | .104 |
| Glass Content, percent | 45.7 | 48.0 | 44.1 | 50.0 | 47.9 |
| | Prepreg | | Not Prepreged | | |
| Sample No. | 48-1 | 48-3 | 69-1 | 69-2 | 69-3 |
| Polyvinyl Chloride/181 Cloth (Volan): | | | | | |
| Flex. strength, p.s.i. | 22,200 | 25,400 | 28,700 | 22,200 | 16,100 |
| Flex. Modulus, p.s.i. | 1.62×10⁶ | 1.85×10⁶ | 2.24×10⁶ | 2.38×10⁶ | 1.43×10⁶ |
| Thickness, in. | .115 | .108 | .096 | .089 | .103 |
| Glass Content, percent | 43.5 | 44.8 | 50.1 | 48.8 | 49.6 |
| | Prepreg | | Not Prepreged | | |

TABLE IV.—EFFECT OF PRE-DEGRADING POLYVINYL CHLORIDE/181 CLOTH LAMINATES

| Sample No. | 1 | 2 | 3 | 4 |
|---|---|---|---|---|
| Flexural Strength, p.s.i. | 22,200 | 33,100 | 25,400 | 38,100 |
| Flex. Modulus, p.s.i. | 1.62×10⁶ | 1.79×10⁶ | 1.85×10⁶ | 2.11×10⁶ |
| Press Temp., °C. | 160 | 160 | 175 | 175 |
| Degraded or not | No | Yes | No | Yes |

TABLE V.—EFFECT OF PRE-DEGRADING POLYVINYL CHLORIDE/SWIRL LAMINATES

| Sample No. | 1 | 2 | 3 | 4 |
|---|---|---|---|---|
| Flexural Strength | 28,000 | 24,300 | 29,300 | 26,800 |
| Flex. Modulus | 1.71×10⁶ | 1.57×10⁶ | 1.66×10⁶ | 1.56×10⁶ |
| Press Temp., °C. | 160 | 160 | 175 | 175 |
| Degraded or not | Yes | No | Yes | No |

EXAMPLE 4

In a manner similar to that described in Example 3 above laminates were prepared with 9 plies of 181 glass fiber fabric with Volan treatment, and 10 plies each of polysulfone resin or polyhydroxy ether resin. These resins had the following specifications:

"Polysulfone," Resin 7, manufactured by Union Carbide Corporation.
Polyhydroxy ether, Resin 8, "Phenoxy A," manufactured by Union Carbide Corporation.

These laminates were prepared under the following conditions and the laminates had the following properties.

| | Laminating Conditions | | Flexural Properties, p.s.i. | |
|---|---|---|---|---|
| | Temp., °F. | Time, Min. | Strength | Modulus |
| Resin 7 | 500 | 15 | 26,805 | |
| | 600 | 15 | 41,447 | |
| Resin 8 | 470 | 15 | 50,917 | 2.5×10⁶ |
| | 500 | 15 | 59,526 | 2.9×10⁶ |

From the foregoing examples, it has been found that by predegrading or degrading the prepreg, it is possible to obtain flexural properties by pressing at 350°–400° F. that could otherwise be obtained only at 450° F. or above. This is significant since the lower temperatures are easily obtainable with steam pressures of 140–250 p.s.i.a. whereas 500° F. requires a steam pressure of over 500 p.s.i.a. This difference is sufficient to permit the use of low temperature steam heated presses and avoid the less practical use of slow and expensive electrically heated platens or other equipment. Another reason it is desired to use the lower temperature, is that higher temperatures are more destructive to caul plates due to the high degree of thermal expansion and contraction.

What is claimed is:

1. A glass-fiber reinforcement material in intimate contact with a thermally degraded resin selected from the group consisting of styrene-acrylonitrile polymers, polyvinyl chloride resins, polyhydroxyether resins, and polyarylene ether resins, said resin being thermally degraded for a period sufficient to improve the physical properties thereof without producing adverse degradation products.

2. The glass-fiber reinforcement material of claim 1 wherein the thermally degraded resin is a styrene-acrylonitrile polymer.

3. The glass-fiber reinforcement material of claim 1 wherein the thermally degraded resin is polyvinyl chloride.

4. A glass-fiber prepreg comprising the glass-fiber reinforcement material and resin of claim 1 wherein the resin-glass ratio is from about 1 to 99 to about 70 to 30.

5. A glass-fiber prepreg comprising the glass-fiber reinforcement material and resin of claim 1 wherein the resin-glass ratio is from about 5 to 95 to about 15 to 85.

6. The glass-fiber reinforcement material of claim 5 wherein the thermally degraded resin is a styrene-acrylonitrile polymer.

7. The glass-fiber reinforcement material of claim 5 wherein the thermally degraded resin is polyvinyl chloride.

8. A glass-fiber reinforced plastic structure comprising at least one layer of glass-fiber reinforcement material sandwiched between at least two layer of matrix resin which has been thermally degraded in contact with said glass fiber reinforcement, said resins being selected from the group consisting of styrene-acrylonitrile polymers, polyvinyl chloride resins, polyhydroxyether resins, and polyarylene ether resins, said resin being thermally degraded for a period sufficient to improve the physical properties thereof without producing adverse degradation products.

9. The glass-fiber reinforced plastic structure of claim 8 wherein the matrix resin is a styrene-acrylonitrile polymer.

10. The glass-fiber reinforced plastic structure of claim 8 wherein the matrix resin is a polyvinyl chloride resin.

11. The method of improving the flexural properties of a glass-fiber resin structure by heating said structure to a temperature and for a period sufficient to degrade said resin without producing adverse degradation products, said resin being selected from the group consisting of styrene-acrylonitrile polymers, polyvinyl chloride resins, polyhydroxyether resins, and polyarylene ether resins.

12. Process of claim 11 wherein the resin is a styrene-acrylonitrile copolymer and the degradation is effected by heating to a temperature of from about 350° to about 500° F. for a period of from about 1 to about 15 minutes.

13. Process of claim 11 wherein the resin is a polyvinyl chloride resin wherein the degradation is effected by heating to a temperature of from about 325° to about 375° F. for a period of from about 1 to about 5 minutes.

14. Process of claim 11 wherein the resin is a polyhydroxyether resin wherein the degradation is effected by heating to a temperature of from about 450° to about 550° F. for a period of from about 1 to about 10 minutes.

15. Process of claim 11 wherein the resin is a polysulfone resin wherein the degradation is effected by heating to a temperature of from about 550° F. to about 700° F. for a period of from about 1 to about 10 minutes.

16. The process of claim 11 wherein the glass-fiber resin structure is a prepreg.

17. The process of claim 11 wherein the glass-fiber resin structure is a laminate and the resin is degraded during lamination in contact with the said glass fiber.

References Cited

UNITED STATES PATENTS

| | | | |
|---|---|---|---|
| 2,877,501 | 3/1959 | Bradt | 264—143 |
| 3,238,087 | 3/1966 | Norwalk et al. | 161—185 |
| 3,305,417 | 2/1967 | Christie | 161—185 X |
| 3,321,449 | 5/1967 | Vogel | 260—79.3 |

OTHER REFERENCES

"Adhesion," Recent Developments in Adhesion Science, A.S.T.M. Special Technical Publication No. 360, published by Amer. Society for Testing Materials, Philadelphia, Pa., June 26, 1963.

"Phenoxy Resin—A New Thermoplastic Adhesive," pp. 87–95, by Bugel et al.

HAROLD ANSHER, Primary Examiner

U.S. Cl. X.R.

156—82, 155, 322; 161—203, 204, 411